United States Patent [19]

Chiu et al.

[11] Patent Number: 5,019,976
[45] Date of Patent: May 28, 1991

[54] METHOD AND SYSTEM FOR RETRIEVING TEXT ASSOCIATED WITH A REFERENCE IMAGE CORRESPONDENCE TO A SELECTED PATIENT IMAGE

[75] Inventors: Lee C. Chiu, Palos Verdes Estates; Yuki N. Ko, Cerritos; Keith N. Wong, Torrance, all of Calif.

[73] Assignee: New World Down Hole Tools

[21] Appl. No.: 461,979

[22] Filed: Jan. 8, 1990

Related U.S. Application Data

[63] Continuation of Ser. No. 059,533, Jun. 8, 1987.

[51] Int. Cl.⁵ .............................................. G06F 15/42
[52] U.S. Cl. ................................. 364/413.13; 340/721
[58] Field of Search ..................... 364/413.13; 340/721

[56] References Cited

U.S. PATENT DOCUMENTS

| | | | |
|---|---|---|---|
| 4,720,707 | 1/1988 | Konishi et al. | 340/721 |
| 4,737,912 | 4/1988 | Ichikawa | 364/413.01 |
| 4,802,104 | 1/1989 | Ogiso | 340/721 |
| 4,875,034 | 10/1989 | Brokenshire | 340/721 |

*Primary Examiner*—Allen R. MacDonald
*Assistant Examiner*—Gail O. Hayes

[57] ABSTRACT

A method of comparing a newly acquired working image with a previously acquired reference image and a system for comparing a newly acquired working image with a previously acquired reference image. A reference text regarding areas of interest is displayed. This invention is particularly useful for displaying and comparing slices obtained by computer tomography and magnetic resonance imaging technology.

22 Claims, 3 Drawing Sheets

| | WORKING IMAGE | REFERENCE IMAGE |
|---|---|---|
| | 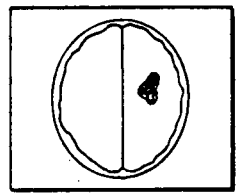 10a | 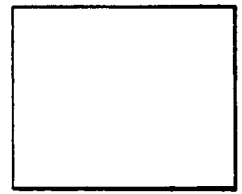 10b |
| | 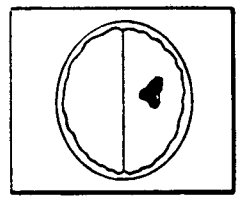 12a | 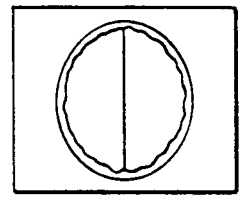 12b |
| | 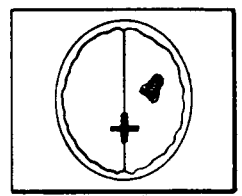 14a | 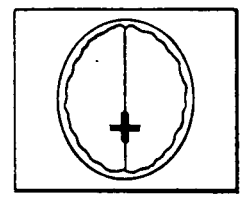 14b |
| | 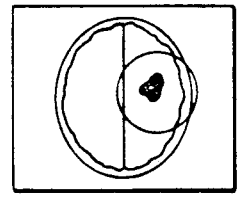 16a | 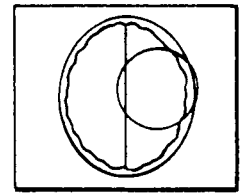 16b |
| | 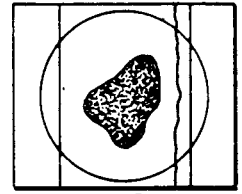 18a | 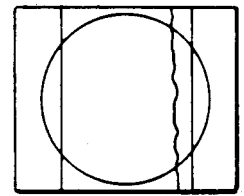 18b |
| | 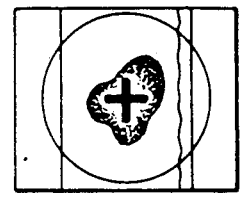 20a | 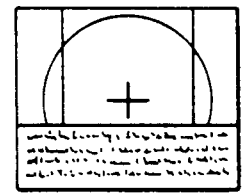 20b |
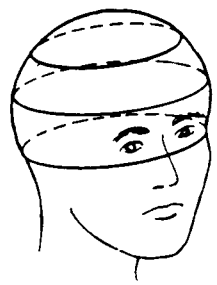
Fig. 1
ACQUIRE WORKING IMAGE
↓
ACQUIRE REFERENCE IMAGE
↓
COMPARE IMAGES
↓
IDENTIFY AREAS OF INTEREST
↓
DISPLAY REFERENCE TEXT FOR AREAS OF INTEREST
Fig. 2
Fig. 3

METHOD AND SYSTEM FOR RETRIEVING TEXT ASSOCIATED WITH A REFERENCE IMAGE CORRESPONDENCE TO A SELECTED PATIENT IMAGE

This application is a continuation of application Ser. No. 059,533, filed 6/8/87.

BACKGROUND OF THE INVENTION

1. Field of the Invention

This invention relates to methods of image processing, particularly methods of comparing images.

2. Prior Art

Computer image processing techniques have created new methods to enhance, analyze, and compare images, particularly X-ray images. Computers can, for example, compare two images obtained by X-ray before and after an X-ray contrast agent is administered, or a first image of an artery taken during systole and a second taken during drastole.

Computers have also allowed the generation of two-dimensional images of "slices" through the interior of three-dimensional objects. Two methods used in medicine for obtaining images that represent "slices" through the human body are X-ray computer tomography (hereinafter "CT") and nuclear magnetic resonance imaging (hereinafter "MR").

The images obtained from CT and MR are extremely useful to a diagnosing physician. Interior regions of the body not normally accessable, except by surgery, can be seen for diagnostic purposes. As the resolution of the techniques improve, more internal structure is shown. Unfortunately, the structure shown in some areas of the body, particularly the brain, is so complex that no physician can be expected to remember the identity and functions of every part of the structure shown. To solve the memory problem, physicians frequently refer to text books of reference images where the features of similar images are identified. This solution is unsatisfactory for several reasons: the physical book must be nearby for use as the physician is operating the computer console; the book may not show the exact series of images the physician desires; and the images in a book cannot be easily updated as new information becomes available.

It would be advantageous to have a system that provides the information found in a textbook in a computer data base. Then, the patient's image could be compared to the reference image at the terminal. Text, regarding specific areas of an image could be obtained to refresh the physican's memory. Furthermore, manipulations of the patient's image could be duplicated on the reference image.

The system of this invention allows the analysis of a working image by comparing it to a previously obtained reference image. Other sorts of images that may be analyzed include micropictographs and image from satellites, for example LANDSAT.

BRIEF DESCRIPTION OF THE DRAWINGS

FIG. 1 shows a head with a plurality of planes cutting therethrough, forming slices.

FIG. 2 shows a process flow chart of the present invention.

FIG. 3 shows a series of images one would see on a CRT screen using the process of this invention.

SUMMARY OF THE INVENTION

Figure 4:
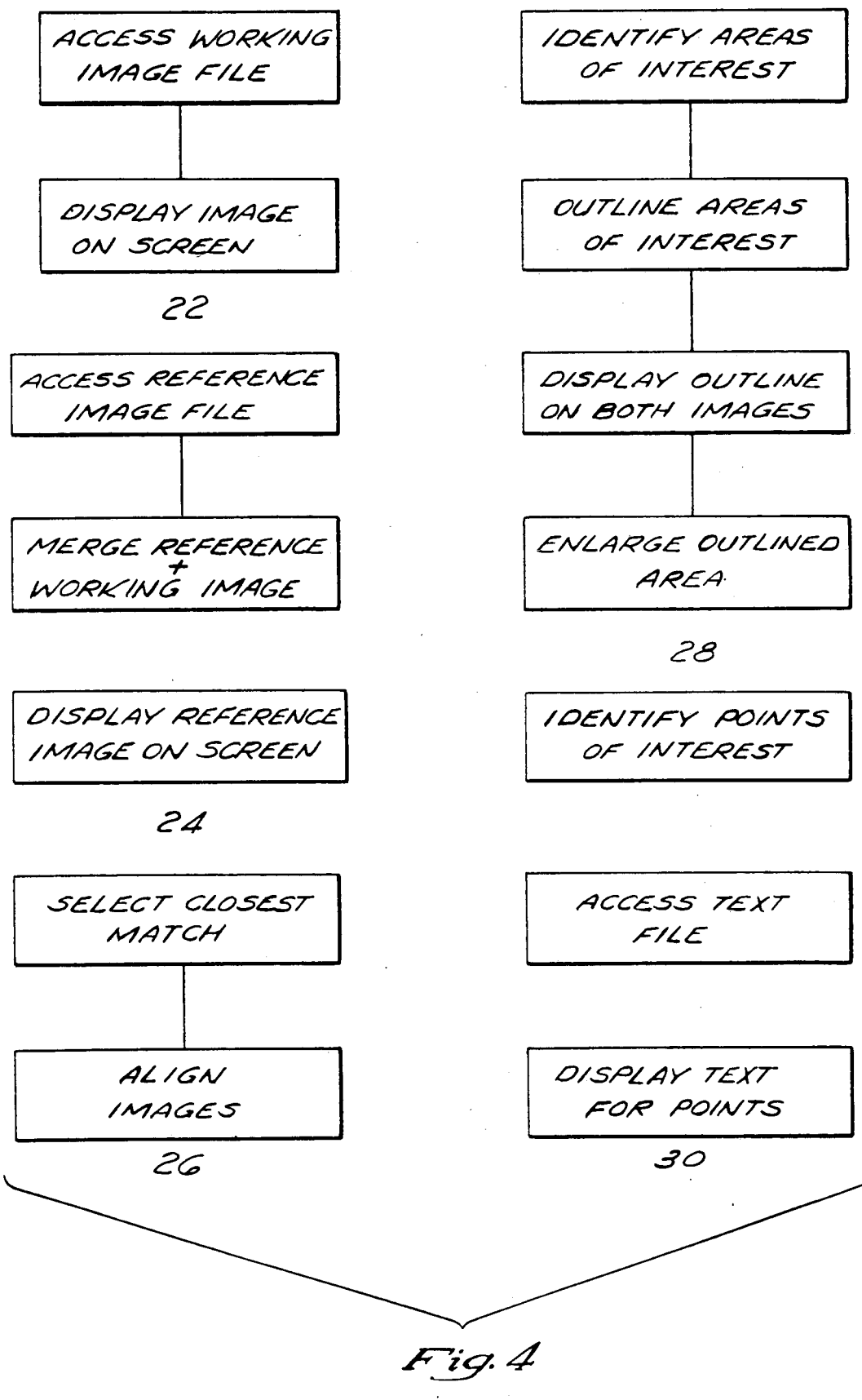
FIG. 4 shows a detailed process flow chart of the present invention.

An aspect of this invention is:

A method for analyzing the data corresponding to a working image displayed on an electronic visual display device comprising:

a) acquiring a working image from a working image file;

b) acquiring a reference image from a reference image file;

c) comparing the working image with the reference image;

d) identifying areas of interest; and e) acquiring text from a reference text file and displaying the text regarding areas of interest.

A further aspect of this invention is:

A system for analyzing the data corresponding to a working image to be displayed on an electronic visual display device comprising:

a working image file, having at least one image;

a reference image file, having at least one image that corresponds to at least one image in the working image file;

a reference text file, having text corresponding to each one image in the reference image file;

means for identifying an area of interest in an image from the working image file;

means for displaying text corresponding to the area of interest.

DETAILED DESCRIPTION

Referring to FIG. 1, a three-dimensional object—a head—has slices defined by a plurality of planes cutting through it. As used herein a "slice" will mean an image that corresponds to what one would see looking at a slice of the head between any two adjacent planes. It is understood that the planes can be in any orientation. An image obtained by CT or MR substantially corresponds to a slice. This is the same image one would see if one cut the head with a knife and viewed it. Since both CT and MR are non-invasive procedures, they are better suited for diagnosing live patients.

Although the terms "physicians" and "patient" are used throughout this application, it is understood that nonphysicians may operate the system and the images may be of people who are not ill. Referring to FIG. 2, in the first step, the working image is acquired from a working image file. As used herein the "working image" will refer to the newly acquired image that is being analyzed. In the medical arts such an image would come from the patient. The data representing the working image file is usually stored, for example, on magnetic tape before the image is analyzed. In MR, for example, the physics of the procedure demands that the entire scan be completed before the data corresponding to any of the slices is completely acquired. However, it is possible, in CT, that the data of the working image file—that is working data corresponding to a slice—be displayed immediately after acquisition. Meanwhile, data corresponding to the next slice can be simultaneously acquired from the patient.

Next, the reference image is acquired from the reference image file. The reference image file is a library of images of sample slices. For example, a reference image in the file could be, in the case of the patient's head, a planar projection of a portion of a healthy head. It is preferred that the reference images clearly show as much detail as possible. The reference file will usually contain images obtained from healthy patients, and may include images obtained from ill patients. The images of ill patients show the physician what a given illness looks like using a particular technique. Images of several different healthy patients may be in the reference image file, providing a bank of normal images and defining the range of normal.

Next, the working image is compared with the reference image. It will be unusual if the images precisely correspond. Therefore, some degree of interpretation is required to compare the images. One method of comparison is to display the patient image next to the reference image, allowing a skilled practitioner, for example, a radiologist, to compare the images.

Areas of interest are more easily seen when comparing a working image to the reference image. In MR, pathological indications are frequently slightly off-color areas in the displayed image that ma be hard to identify visually without a comparison.

Once the areas of interest have been identified in the patient image, the text from the reference image that corresponds to these images can be displayed.

preferably each point in the image will have reference text associated with it. The reference text will be independently accessible from a reference text file. Whatever text is deemed desirable can be included. The reference text for a given feature will preferably be displayed when the system is in an image/test corresponder mode and the cursor is moved over the feature. In a preferred embodiment, the text can occupy the lower half of the screen. However, the location and content of the text are the system designer's choice.

Referring to FIG. 3, two images of slices, for example, horizontal slices of a head, are shown for each step of the process of FIG. 2. These represent images that one using this invention might see on a cathode ray tube (CRT) display. The first column of images are those identified with an a, represent working images that have been acquired and are being analyzed. The second column of images, those identified with a b, represent the corresponding reference image that has been acquired and is being similarly processed. The images are shown, for clarity, as two separate screens. In practice, the preferred method of display is to position the working image onto a field within the CRT screen, and to position the reference image onto a second, non-overlapping field on the same CRT screen. Therefore, both images are conveniently side by side on the same screen for comparison.

The particular working image is a planar projection through the head of a patient 10a. The working image displayed has just been acquired from the working image file. An abnormal region that may correspond to a pathological condition is shown by the darkened region in the image. A real image may have less contrast than this image, so it may be much more difficult to visually identify abnormal regions. Therefore, it may be advantageous to have conventional image processing software available to enhance the image. After the abnormal region has been visually identified on the screen, the physician still needs to know the anatomical features of that area of the brain, the function of that region of the brain, and the various anatomical features, the local vasculature of the region, and possibly other information as well.

The reference image 12b is then acquired from the reference image file and displayed. The physician will already know what series of planar images to review, but he may not know which image corresponds more closely to the working image. Furthermore, he may wish to compare several equivalent reference images taken from different individuals to see if any one corresponds to the working image more closely than the other. Therefore, the physician may scroll through a series of reference images until the reference image that more closely corresponds to the working image is found. Once the image that corresponds more closely is found, the physician can compare the working image 12a with the selected reference image 12b. In the example given, the physician would notice the abnormal region of the patient's image.

In the method of this invention, it is preferred that the images correspond, that is, every point on the working image corresponds to a point on the reference image. Then an operation done to one image can be automatically and accurately repeated on the other. It is preferred that the imaging system have a movable cursor that can be simultaneously manuvered throughout the field of both the working image and the reference image. The two images can be aligned by positioning the cursor over a feature found in both images. The feature is then located at the same location in the working image field 14a and the reference image field 14b. The trained physician can locate similar features in the two images, and, by moving the cursor over them, align them.

The cross 15 is over a similar structure in both images. If the location of the cross was different, the images would be aligned. Then the cross would be at the same location in each image.

It is preferred that the area of interest—the dark region—be outlined by using the cursor 16a. It is preferred that a corresponding outline will simultaneously appear on the aligned reference image 16b as well. The resulting outlined region on the reference image will show any fine structure that may be obliterated by the abnormality on the working image.

Once the corresponding images have been outlined, it may be advantageous to enlarge the outlined area. If the outlined area is very small or if the area on the aligned reference image shows an abundance of fine structure, such enlargement is very helpful. It is preferred that when the working image is enlarged 18a, the reference image is simultaneously enlarged 18b. The enlarged image can then be analyzed by the physician.

The physician can then place the cursor over specific points of interest within the area of interest. Preferably, he can select the point from either the working image 20a or from the reference image 20b. The working image will show the physician where abnormal conditions are, and the reference image may show structure missing in the working image. Once the cursor has been positioned over a specific point, the reference text corresponding to that point can be acquired from the reference text file and displayed. The reference text can be displayed on either image, or if the images are on the same screen, it can be displayed over both images.

It will be appreciated by those skilled in the art that many of the steps described above as being done manually by the physician can be done automatically. The data bases can be acquired and compared automatically. The closest reference image can be automatically selected, for example, by matching skull or other anatomical shapes. The contrast can be adjusted by conventional methods so the contrast in the two images are as nearly the same as possible. If the images need further adjustment, the reference image can, for example, be distorted by the use of conventional software, thereby providing outlines of the skull that are identical. This provides images that correspond more accurately than randomly selected reference images. Then the images can be automatically processed by, for example, subtracting the pixel values of one image from the pixel values of the other. Then only the unique features will remain, including any abnormal conditions. The location of the unique features tells the computer what text to display. The result is a totally automated diagnostic system Of course, if the physician questions the diagnosis, he can obtain the results manually as described above.

Referring to FIG. 22, the working image file is accessed. The data on the working image file can be stored on, for example, mangetic tape, or it can be acquired in real time, for example, as in the case of CT. Preferably, the data is then displayed as an image in a pictorial form, for example, on a CRT screen. Alternatively, the data can be processed further by computer, as described above.

In FIG. 24, the reference image file is accessed, and the data corresponding to a reference image is acquired. The reference image is preferably shown as an image on, for example, a CRT screen. It is preferable to display the reference image as a different image field on the same screen as the working image. As used herein, a "field" is a discrete portion of the display screen. For example, the image on the screen can show two different pictures, one on the top half, the other on the bottom. Each picture then occupies its own field. Therefore, the reference image is merged with the working image in such a manner as to form two non-overlapping images in the same screen.

In FIG. 26, the reference image that more closely matches the working image is selected by scrolling through the images in the reference file. In general, the location of the closest matching image can be accurately guessed at, reducing the number of comparison images. For example, if a working image of a slice of a patient's head is taken just above the eyebrows, only those reference images taken just above the eyebrows need to be compared.

Once the best match is obtained, the images are aligned. A similar structural feature is found in both images. The feature is positioned in a location in the working image field. The same feature is located in the same location in the reference image field. Preferably, it is located in the reference image field automatically. Preferably that feature in the images is centered in the field of both the working image and the reference image. The resulting alignment is not perfect if the working object and the reference object have different shapes. However, the alignment is accurate enough so that any structural feature in the first image is substantially at the same location in the second image.

In FIG. 28 the areas of interest are isolated. Once the two images are compared, abnormalities in the working image are generally easily seen. The identification of areas of interest allows the area to be outlined.

It is preferred that the cursor of this system have a mode that allows a line to be drawn as the cursor is moved. Such a cursor can then outline areas displayed on the screen. When the working image and the reference image are aligned, it is preferred that when an area in the working image is outlined, the corresponding area in the reference image is also outlined.

The outlined images may be enlarged to allow detailed scrutiny. The advantage of outlining is that similar structures are outlined in both drawings. Therefore, the structure that may not be well resolved in the working image may be better resolved in the reference image.

Referring to FIG. 30, the physician can then identify specific points of interest on the two images. The cursor mode can be changed so that when it is positioned over the specific points of interest corresponding text can be accessed from the reference text file. The text can then be displayed on the screen.

Figure 5:
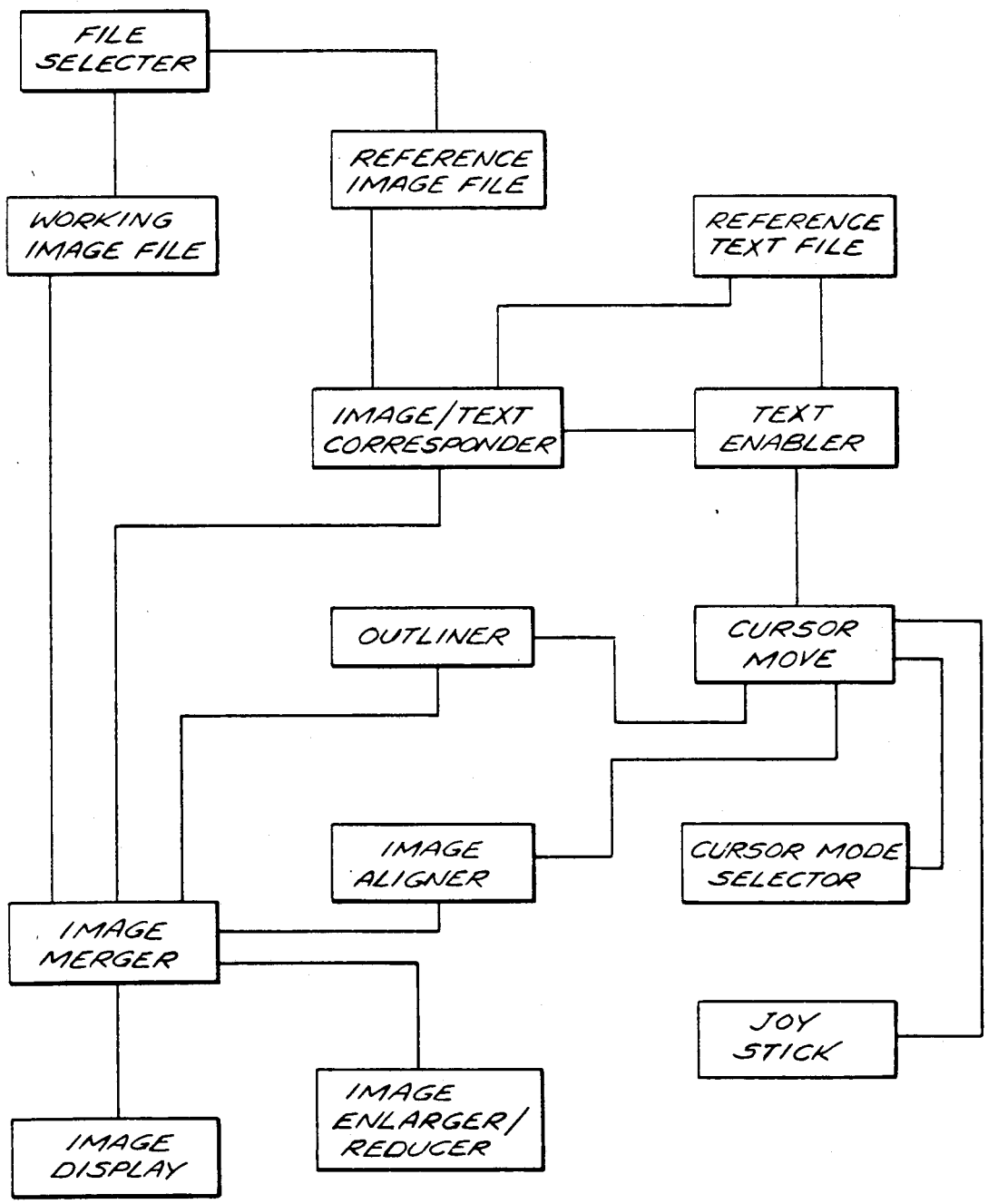
FIG. 5 shows the connections of a series of functional units that define a machine that performs the present invention.

Referring to FIG. 5, the file selector allows the use to select either the working image file or the reference image file. The working image file will have at least one image, and the reference image file will have at least one image that corresponds to at least one image in the working image file. Usually in a diagnosis the working image is acquired first. When the working image file is selected, data representing the image goes through the image merger and is displayed on the image display. When only one input line to the image merger is activated the image merger behaves as if it were not there. A CRT is the preferred image display, but any usual mode of displaying the image or creating hard copies of images can be used. As discussed above, although display of the image is preferred, it is not required. The data representing the image can be processed automatically.

When an image from the reference image file is selected, it too can be directly displayed. If, however, a patient image is already displayed, the image merger is activated. The images are compared using a means for identifying an area of interest. Preferably the means is an image merger that allocates half the screen space to one image and half to the other.

The cursor move is an apparatus that allows a cursor, which is displayed on the screen to be moved to any location on the screen. The cursor, when on the screen, can look like any character on the type set or preferably be a special character, for example, an arrowhead or a cross. The cursor has three modes that can be selected by the cursor mode selector. The three modes are the text enabler, the outliner and the image align. The joy stick is any conventional means used to move a cursor on the screen.

In the image aligner mode, the joy stick is used to move the cursor first over a feature in the patient image. It is then moved over the corresponding point in the reference image. The image align command then puts both points into the same location in both fields. For example, the image align may center each image around the reference point. The image align can be commanded to locate the reference point at any arbitrary point within the field, for example, near the top right corner. However, it is preferred that a structure near the center of the image be selected as the reference point, thereby allowing both images to be centered.

After the images are aligned the cursor mode selector is then set for the outliner. The outliner allows the cursor to be moved and forming a line over the path of the cursor. The outliner simultaneously outlines the corresponding area on the working image and the reference image. The cursor is positioned near any spot of abnormality or interest. The area of the patient image is then outlined, and the corresponding area in the reference image is automatically outlined.

The outlined regions of the image can then be enlarged using the image enlarger/reducer. The image enlarger reducer will fill the field with the outlined image. This is particularly useful if the region of interest is small.

Once the region of interest has been isolated on the screen, the cursor mode selector is moved to the text enabler mode. The cursor, on the screen, is moved with the joy stick to any particular point of interest, and the corresponding text requested.

A means for displaying text corresponding to the point of interest accesses the reference text file and displays the appropriate text. Preferably, the text enabler simultaneously accesses the reference text file and enables the image/text corresponder. The image/text corresponder identifies the location of the cursor, in both image number, and position on the image. The text that corresponds to that point is accessed from the text file in memory. Both the reference image and the text are input to the image merger and the text is allocated a location on the screen. The preferred location is the bottom half of the screen.

We have described a preferred embodiment of the claimed invention. Obvious variations are readily apparent to those skilled in the art. Therefore, we intend that our invention be limited only by the appended claims.

We claim:

1. A method for analyzing the data corresponding to a working image displayed on an electronic visual display device comprising:
   a) first acquiring a working image from a working image file;
   b) second acquiring a reference image from a reference image file;
   c) third comparing the working image with the reference image;
   d) fourth identifying areas of interest; and
   e) fifth acquiring text from a reference text file after the working image and the reference image have been acquired, displayed, and compared and displaying the text regarding areas of interest.

2. The method of claim 1, including the step of displaying the working image after acquiring the working image data from the working image file.

3. The method of claim 1, including the step of displaying the reference image after acquiring the reference image data from the first data bank.

4. The method of claim 3, wherein said reference image is displayed on the same screen as a previously displayed working image.

5. The method of claim 1, including the step of scrolling through a series of reference images to find the closest match with the working image.

6. The method of claim 1, including the step of obtaining correspondence of the working image and the reference image.

7. The method of claim 6, including the steps of:
   selecting the same feature in the working image and the reference image; and
   positioning that feature in the same location within the field o( the working image and the field of the reference to obtain correspondence.

8. The method of claim 1, including the step of outlining the areas of interest in the working image.

9. The method of claim 8, including the steps of:
   obtaining image correspondence between the working image and the reference image; and
   outlining the corresponding areas of interest simultaneously in both the working image and the reference image.

10. The method of claim 9, including enlarging the outlined areas such that the outlined areas substantially occupy the field of said working image and said reference image.

11. The method of claim 1, including the step of indentifying a point of interest within the area of interest.

12. The method of claim 11, including the step of displaying the reference text for the point of interest.

13. A system for analyzing the data corresponding to a working image to be displayed on an electronic visual display device providing textbook information regarding particular areas of interest within the working image, comprising:
   a working image file, having at least one working image;
   a reference image file, having at least one reference image that corresponds to at least one working image in the working image file;
   means for identifying a particular area within said reference image of said reference image file which corresponds to a particular area of interest identified within said working image of said working image file;
   a means for accessing reference text after identification of the particular area of interest in said reference image, having reference text corresponding to said particular area of interest in said working image; and
   means for displaying the reference text corresponding to the area of interest.

14. The system of claim 13, wherein said means for identifying areas of interest is an image merger that places the reference image onto the same screen as the working image.

15. The system of claim 13, wherein said means for displaying text includes text enabler that accesses the reference text file and a image/text corresponder, said image/text corresponder providing the corresponding text to each point in the reference image.

16. The system of claim 15, wherein said means for displaying includes an image merger that places the reference image, the reference text, and the working image onto the same screen as the working image.

17. The system of claim 13, including an image aligner that positions a feature in the working image in a particular location in the field of the working image while simultaneously positioning a corresponding feature of the reference image in the same location.

18. The system of claim 17 that includes an outliner that outlines a area of interest in the working image while simultaneously outlining the corresponding area in the reference image.

19. The system of claim 18, including means to move a cursor.

20. The system of claim 19, wherein said cursor forms a line on the screen as it is moved.

21. The system of claim 13 wherein said means for displaying text includes a text enabler that simultaneously accesses a reference text file and an image/text corresponder.

22. The system of claim 21 wherein said image/text corresponder identifies the location of the cursor and access the corresponding text from said reference text file.

* * * * *

UNITED STATES PATENT AND TRADEMARK OFFICE
CERTIFICATE OF CORRECTION

PATENT NO. : 5,019,976

DATED : May 28, 1991

INVENTOR(S) : Lee C. Chiu et al

It is certified that error appears in the above-identified patent and that said Letters Patent is hereby corrected as shown below:

ON THE TITLE PAGE:   Item [73]

should read "Research and Education Institute Inc. Harbor-UCLA Medical Center".

Signed and Sealed this

Sixth Day of October, 1992

Attest:

DOUGLAS B. COMER

*Attesting Officer*　　　*Acting Commissioner of Patents and Trademarks*